United States Patent [19]

Schwitters

[11] Patent Number: 5,074,227
[45] Date of Patent: Dec. 24, 1991

[54] SEED PLANTING APPARATUS

[75] Inventor: Wayne J. Schwitters, Clara City, Minn.

[73] Assignee: WIC Incorporated, Clara City, Minn.

[21] Appl. No.: 548,860

[22] Filed: Jul. 6, 1990

[51] Int. Cl.[5] .............................................. A01C 5/06
[52] U.S. Cl. .................................... 111/137; 111/164; 111/926
[58] Field of Search ....................... 111/52, 59, 60, 62, 111/66, 81, 134, 135, 137, 157, 163, 164, 165, 167, 185, 926

[56] References Cited

U.S. PATENT DOCUMENTS

| | | | |
|---|---|---|---|
| 2,332,012 | 10/1943 | Rasmussen | 111/88 |
| 2,685,243 | 8/1954 | Cole | 111/88 |
| 3,499,495 | 3/1970 | Pust | 172/536 |
| 3,543,704 | 12/1970 | Hansen et al. | 111/52 |
| 3,749,035 | 7/1973 | Cayton et al. | 111/926 X |
| 4,009,668 | 3/1977 | Brass et asl. | 111/85 |
| 4,207,823 | 6/1980 | Steilen et al. | 111/164 |
| 4,374,500 | 2/1983 | Westerfield | 111/137 X |
| 4,404,918 | 9/1983 | Whalen et al. | 111/137 X |
| 4,408,551 | 10/1983 | Keller et al. | 111/137 X |
| 4,423,788 | 1/1984 | Robinson, Jr. et al. | 111/164 X |
| 4,430,952 | 2/1984 | Murray | 111/137 X |
| 4,596,200 | 6/1986 | Gafford et al. | 111/164 X |
| 4,664,290 | 5/1987 | Martin et al. | 111/185 X |

OTHER PUBLICATIONS

Nodet Gougis, Pneumasem II Vacuum Planter.
ACCORD Landmaschinen, H. Weiste & Co. GmbH, OPTIMA.

Primary Examiner—David H. Corbin
Assistant Examiner—Jeffrey L. Thompson
Attorney, Agent, or Firm—Peterson, Wicks, Nemer & Kamrath

[57] ABSTRACT

The disclosed planting apparatus includes a frame fixedly attached to a transversely extending tool bar. Secured to the tool bar and extending rearwardly therefrom is a platform on which the seed hopper and herbicide container are mounted. Seed from the hopper is dispensed downwardly to a seed metering device which deposits seed at uniformly spaced intervals into a furrow formed by a pair of furrow-opening discs and a shoe associated therewith, the shoe packing or compacting the soil at the bottom of the furrow formed by the discs. Playing an important role in the invention is a walking beam system which mounts a pair of gauge wheels for independent movement relative to each other and also relative to the furrow-opening discs and shoe. Also supported by the walking beam system is a pair of furrow-closing or press wheels, the pitch of which can be adjusted for varying soil conditions. The depth of the furrow is initially selected by positioning a handle which raises and lowers an articulated link assembly that acts against the pair of pivotal arm units on which the gauge wheels are rotatably journaled and also acts against a rearwardly extending arm unit that supports the press wheels at the rear of the apparatus. In this way, unevenness and/or obstacles encountered by either of the gauge wheels will not adversely affect the planting depth that has been selected by positioning the handle relative to a depth-indicating gauge.

20 Claims, 9 Drawing Sheets

SEED PLANTING APPARATUS

BACKGROUND OF THE INVENTION

1. Field of the Invention

This invention relates generally to seed planting apparatus, and pertains more particularly to a planter providing a controlled seed depth and spacing.

2. Description of the Prior Art

Furrow planting is widely practiced for row crops, such as sugar beets. Apparatus for this purpose is expected to open the seed furrow to the proper depth and then meter the seed into the furrow at acceptable spaced intervals, and finally cover the seed with a sufficient degree of compaction for the particular type of crop. Of course, certain crops demand more control of the planting factors than others. Nonetheless, establishing and maintaining an accurate depth control, together with the proper placement of the seeds into the soil, are critical factors to be taken into account irrespective of the particular crop seed being sown. If these basic factors are ignored or not appropriately taken care of (as is the case with certain of the seed planting apparatus with which I am acquainted), especially where moisture conditions vary widely, termination and emergence can be appreciably slowed or even prevented. Attempts, however, have been made in the past to provide better depth control, and to some extent more accurate spacing of the emplaced seed, but such limited attempts have resulted in unnecessarily costly and intricate planters. An example of such a planter is disclosed in U.S. Pat. No. 3,749,035 granted on July 31, 1973 to Cayton et al for "PRECISION DEPTH SEED PLANTER."

SUMMARY OF THE INVENTION

An important object of my invention is to provide a simplified planter for accurately controlling the planting depth when planting various crop seeds. A more specific aim of the invention is to provide a precise degree of control irrespective of the soil's moisture content. In this regard, it is to be observed that when the soil is moist and soft, the planting apparatus sinks deeper into the soil as contrasted to a condition in which the soil is relatively dry and hard. In the accurate controlling of the planting depth, my invention makes use of a walking beam system in which the two gauge wheels move independently of each other and of course independently of the furrow opening discs, as well as independently of the trailing furrow-closing or dress wheels. By the same token, the press wheels, while mounted for up and down movement in unison, move independently of the two forwardly disposed gauge wheels. Hence, planting apparatus constructed in accordance with my invention can traverse various types of soil and control quite accurately the depth of the furrow once the implement has been set for a desired depth.

Another object of the invention is to enhance the depth control feature alluded to above by locating the seed hopper, and hence the weight of the seed to be sown, so that the weight thereof is carried on the transverse tool bar and not on the planting apparatus itself, some of the weight being only indirectly supported by the gauge and press wheels. In this way, the depth can be set or adjusted initially and maintained more accurately as the planter traverses a field, even though the soil conditions may vary quite widely. Also, it should be noted that the seed to be planted weighs a considerable amount when the hopper is full, yet gradually decreases in weight as the seed is dispensed and progressively deposited in the furrow. In other words, even if the soil conditions remain substantially constant throughout a pass over a field, the relatively heavy weight of the seed will make the planter initially go deeper into the soil, yet as the seed is dispensed and the weight decreases the planter will gradually rise with a concomitant decrease in the depth of the furrow.

Yet another object of the invention is to maintain a uniform spacing of the seed in the furrow as it is formed as well as a controlled depth of seed planting by avoiding the use of a delivery tube that causes the seed to glance or bounce from one side of the tube to the other. In this regard, an aim of my invention is to introduce the seed into the furrow at only a slight elevation above the furrow. Because of the short seed drop, the seed is deposited in the deepest part of the furrow as the planter advances across the field rather than spasmodically onto either sloping side of the furrow and thus not consistently at the deepest portion or bottom of the furrow. Specifically, my invention allows the seed to be dropped into the furrow at only about three inches thereabove, whereas tubes with which I am familiar require a dropping of from 16 to 18 inches, the full length of the tube. The downward travel time of seeds passing through a tube of such length (16 to 18 inches) also may vary to such a degree that the individual seeds are not uniformly spaced relative to each other because some fall more rapidly than others. For instance, where the tube is relatively long, some seeds strike the sides of the tube, bouncing back and forth during their descent, which dramatically slows the fall of such seeds, resulting in an irregular spacing of the seeds as deposited in the furrow.

Still another object of my invention is to provide a degree of compaction that additionally contributes to a more uniform furrow depth. To achieve this goal, I employ a shoe that extends downwardly approximately ⅜ths of an inch below the furrow-opening discs. By packing the soil at the bottom of the furrow, a firm seed bed is produced and the compacted bottom is made uniform at the lowest portion or bottom of the furrow. Without the shoe, it will be recognized that the furrow-opening discs literally flip the soil to either side as they move forwardly and that certain types of soil, especially rather dry soil that partially refills the furrow. When using my planting apparatus, the shoe, being somewhat lower than the discs, effectively compacts the soil, not only providing a furrow of uniform depth but also causing the soil's moisture to be concentrated more at the top of the packed seed bed than otherwise.

Also, an object of the invention is to plant at relatively high speeds and at the same time derive a more accurate spacing of the seed. It has already been mentioned that no seed delivery or feed tube is employed and the short drop distance of the seed when practicing the teachings of my invention enables the planter to be pulled more rapidly over the field during a planting operation.

The invention has for still another object the assurance that the seed will not only be uniformly spaced but that skips will not result. The invention makes use of a conveniently located door or window that enables a person to walk behind the machine while it is being operated by another person, the person walking behind being able to look into the seed metering device that is located close to the ground and which is depositing the seed at only several inches above the ground. Also, provision is made for wiping any excess seed from the metering disc contained in the device so that only one seed is lodged in each hole and thus only one seed is dropped at any given moment into the trench or furrow that is being formed.

Also, it is within the purview of my invention to adjust the pitch of the closing or press wheels so that the pressure being exerted against the soil during the closing operation can be increased by having the lower peripheral portions of these wheels closer together.

Briefly, my invention envisages a planter that can be adjusted for various furrow depths and the adjusted depth maintained irrespective of varying soil conditions. This is accomplished with what will be called a walking beam system which mounts the two gauge wheels for independent movement so that when one gauge wheel is raised by reason of encountering uneven soil or an obstacle such as a rock, the other gauge wheel will function as a reference, maintaining the desired depth of the furrow-opening discs. Furthermore, the walking beam system incorporated into my planting apparatus enables the trailing closing or press wheels to also move up and down independently of the forwardly positioned gauge wheels, although the press wheels are understandably not mounted for relative movement with respect to each other. Also, my invention contemplates the mounting of the seed hopper so that its weight and the weight of the seeds contained therein are borne mainly by the transverse tool bar to which additional planting units are attached or mounted, there being one unit for each row to be planted. By virtue of a metering device for the seed located just above the furrow being formed, the seed is deposited in the furrow without having to pass through a lengthy delivery, avoiding the travel time and the inconsistency of seed droppage experienced with conventional delivery tubes. Still further, the metering device utilized when practicing my invention includes a metal door that, when open, permits a person following the planter to check on the dropping of the seed, in this way ascertaining whether the seed is being dropped uniformly and without skips.

DESCRIPTION OF THE PREFERRED EMBODIMENT

Figure 1:
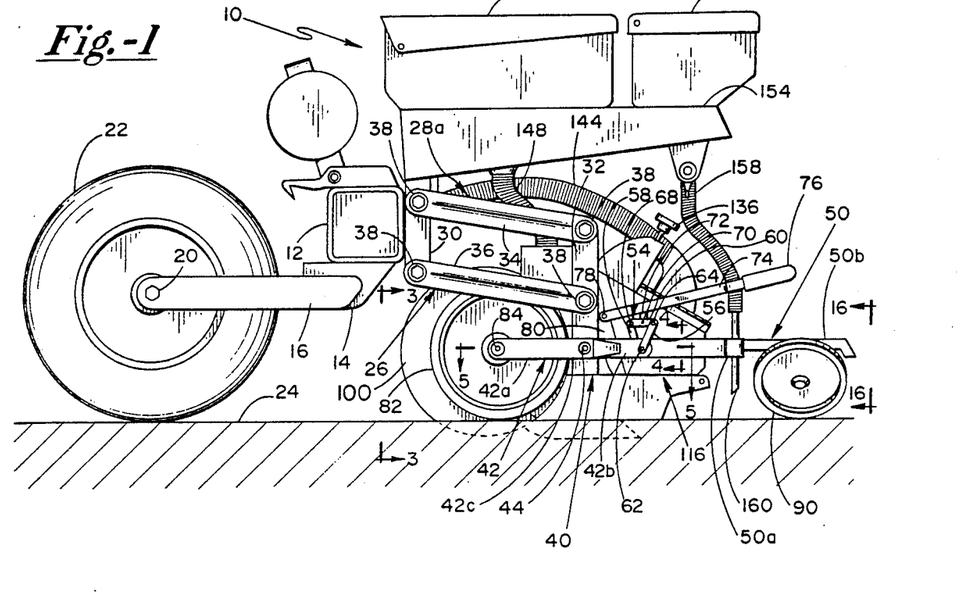
FIG. 1 is a side elevational view taken from the left, the apparatus being adjusted to produce a relatively shallow furrow and with both gauge wheels (only one of which appears) traversing even or relatively smooth ground.

Referring first to FIG. 1, the planting apparatus exemplifying my invention has been denoted generally by the reference numeral 10. It will be appreciated that the apparatus 10 forms only one furrow as it traverses the field to be planted. In other words, if there are twelve rows to be planted, there would be twelve planters identical to the apparatus 10. Thus, a transverse tool bar 12 would have twelve of the planters 10 secured thereto. The tool bar 12, as is conventional, would also have a three-point hitch (not shown) facing to the left in FIG. 1 so that the apparatus 10 (together with similar such planters 10) could be pulled (to the left as viewed in FIG. 1) by a tractor (not shown). A bracket 14 is secured to the underside of the tool bar 12 and a pair of forwardly projecting arms 16 (actually two such pairs of arms 16 would be employed for an apparatus intended to plant twelve rows), the rear ends of the arms 16 being attached to the bracket 14 which is secured to the tool bar 12, as by bolts (not shown). At the forward ends of the arms 16 is a shaft or axle 20 which rotatably supports a ground-engaging wheel 22, the ground or soil being denoted in the various figures by the reference numeral 24. Also not illustrated are the conventional markers that are employed for guiding the apparatus 10 (and other planters 10) across the field being planted.

Figure 2:
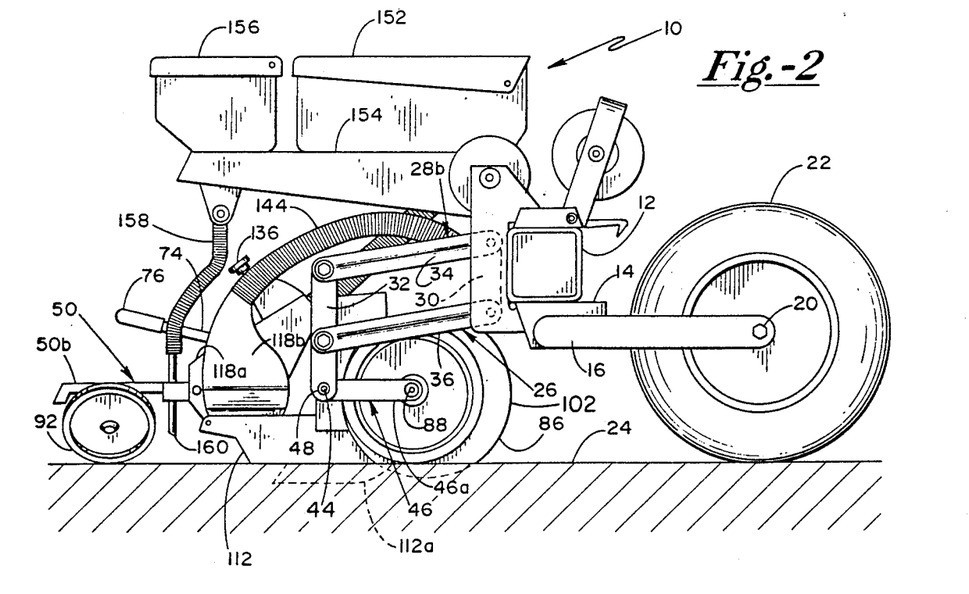
FIG. 2 is a side elevational view corresponding to FIG. 1, but viewed from the right side of the apparatus.

At this time, attention is directed to a frame indicated generally by the reference numeral 26 which is secured to the tool bar 12 (in actual practice by U-bolts). when twelve planters 10 are employed, such as would be the case where there are twelve rows to be planted, the use of U-bolts enables each planter 10 to be properly spaced with the next adjacent planter 10 so that the row spacing will be uniform and equal. It is not believed necessary to show and refer to all of the components constituting the frame 26. However, the frame 26 includes units 28a and 28b in the form of parallelograms, the unit 28a being visible in FIG. 1 and the unit 28b being visible in FIG. 2. Each unit 28a, 28b includes a forwardly disposed vertical strut 30 (which is secured to the rear side of the tool bar 12), a rearwardly disposed vertical strut 32, an upper inclined strut 34 and a lower inclined strut 36. Four bolts 38 fasten the struts 30-36 together so that a rigid frame 26 results.

Figure 5:
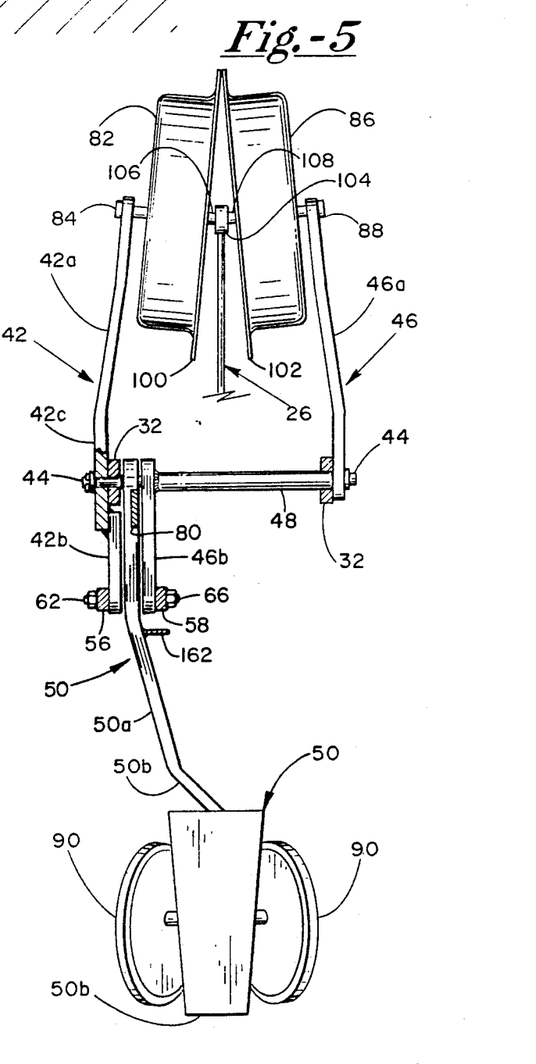
FIG. 5 is a horizontal view taken generally in the direction of line 5—5 of FIG. 1 (although with some parts omitted for simplicity reasons) in order to show how the up and down movement of the gauge wheel appearing in FIG. 2, which is the gauge wheel at the left in FIG. 3, is controlled in relation to the motion of the gauge wheel appearing in FIG. 1, which is the wheel at the right in FIG. 3.

Playing an important role in realizing the benefits of my invention is what will be termed a walking beam system 40. As viewed in FIG. 1, the walking beam system 40 comprises an arm unit 42 which includes a forward segment or portion 42a, a rear segment or portion 42b and an intermediate segment or portion 42c. A pin or shaft 44 pivotally mounts the intermediate portion 42c of the arm unit 42 to the lower end of the rearwardly disposed vertical strut 32 belonging to the parallelogram unit 28a. Functionally similar, but structurally different, to the arm unit 42 is an arm unit 46 comprised of a forward segment or portion 46a as can be readily seen in FIG. 2 and also in FIG. 5 and a rearwardly disposed segment or portion 46b. As can be seen in FIG. 5, the forward segment 46a has its rear end secured to a transverse tube or shaft 48, and the forward end of the segment 46b similarly secured to the same tube or shaft 48, but laterally displaced from the segment 46a. Stated somewhat differently, the segments 46a and 46b are laterally offset from each other for a purpose presently to become manifest.

Figure 15:
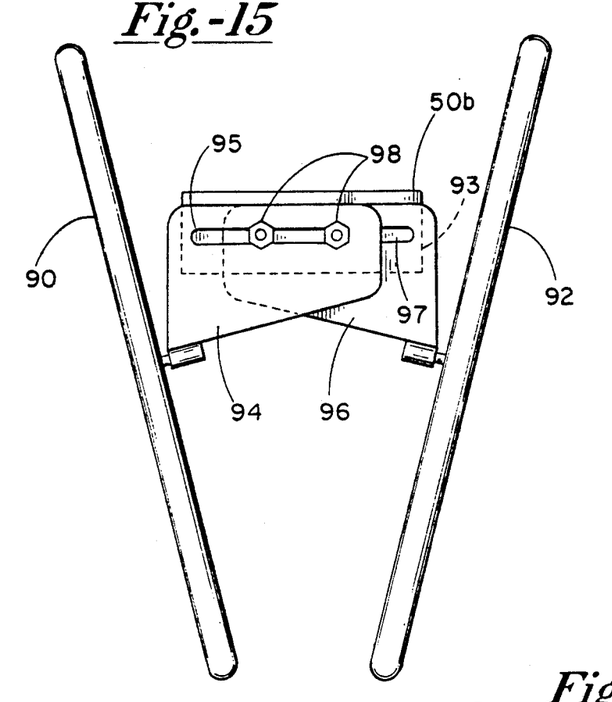
FIGS. 15 and 16 are elevational views taken in the direction of line 16—16 of FIG. 1 for the purpose of showing how the spacing of the press wheels can be adjusted.

The walking beam system 40 additionally includes a rear arm unit 50 constituting a forward channel portion or segment 50a residing in a vertical plane and a rear segment or portion 50b residing in a horizontal plane. Whereas the segment 50a is nearer the viewer in FIG. 1 (and thus more toward the left when the apparatus 10 is viewed from the rear), the segment 50b is centrally located when so viewed. The rear end of the segment 50b has a downturned flange 93 (FIGS. 15 and 16), the purpose of which will soon be explained.

Figure 4:
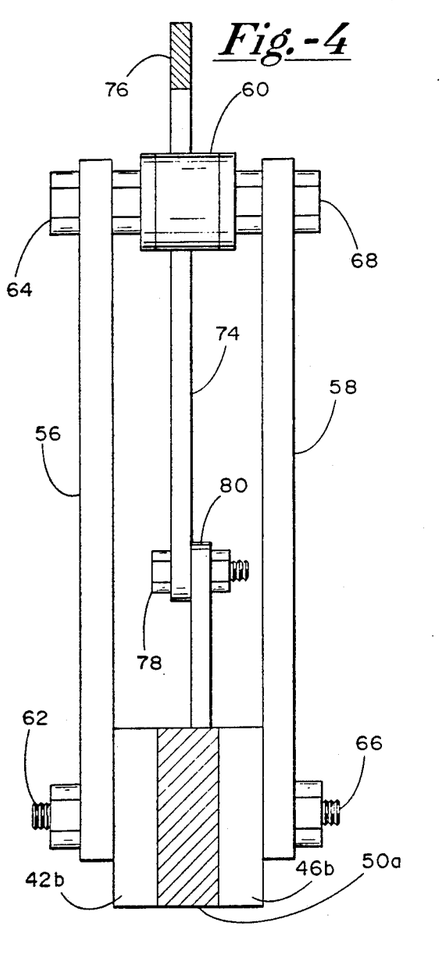
FIG. 4 is an enlarged detail taken in the direction of line 4—4 of FIG. 1 for the purpose of illustrating to better advantage the articulated linkage assembly which is an important component of my walking beam system.

Included in the walking beam system 40 is an articulated linkage assembly 54 comprised of left and right links 56 and 58, respectively, the link 56 being nearer the viewer in FIG. 1 and to the left in FIG. 4. At the upper ends of the links 56 and 58 is what will be called a butterfly 60. what the butterfly 60 constitutes is simply a pair of slightly laterally spaced links. It should be understood that there is a lower pivot pin 62 that pivotally connects the link 56 to the rear segment 42b of the arm unit 42; an upper pivot pin 64 pivotally connects the upper end of the link 56 to the right end of the butterfly 60, as viewed in FIG. 1. Similarly, a lower pivot pin 66 (FIG. 4) connects the lower end of the link 58 to the rear end of the segment 46b of the arm unit 46;

an upper pin 68 pivotally connects the upper end of the link 58 to the forward end of the butterfly 60 (as viewed in FIG. 1).

An intermediate pivot pin 70 extends through an ear 72 which is integral with the lower edge of a depth-adjusting handle member 74 having a hand grip 76 at its rear end. It will be appreciated that the pivot pin 70 extends through the butterfly 60; as already explained, the butterfly 60 constitutes a pair of laterally spaced links, thereby providing space for the accommodation of the downwardly projecting ear 72. The forward end of the handle member 74 has a pivot pin 78 connecting the forward end thereof to an upstanding ear 80 on the previously mentioned forward segment 50a of the arm unit 50.

Figure 3:
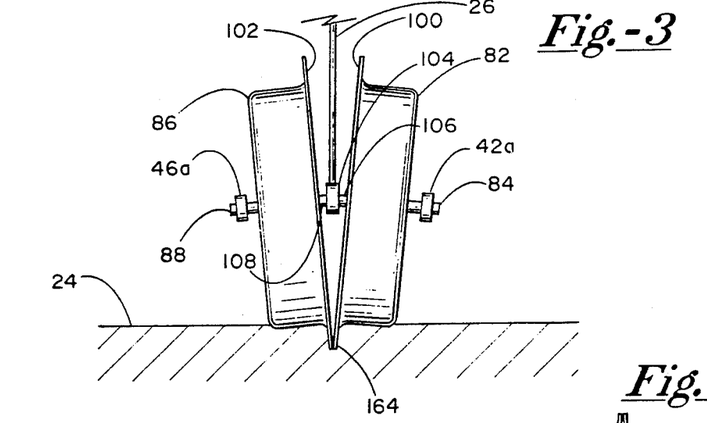
FIG. 3 is an enlarged detail taken in the direction of line 3—3 of FIG. 1 for the purpose of showing the furrow-opening discs in relation to the two gauge wheels.

Having presented the foregoing description of the walking beam system 40, it will now be appreciated that a left gauge wheel 82 (visible in FIG. 1 and appearing at the right in FIG. 3) is journaled to the forward end of the segment 42a of the arm unit 42 by means of a pin or shaft 84. Similarly, the other gauge wheel, which has been designated by the reference number 86, is journaled for rotation at the forward end of the segment 46a belonging to the arm unit 46, the journaling being by means of a pin or shaft 88.

Figure 16:
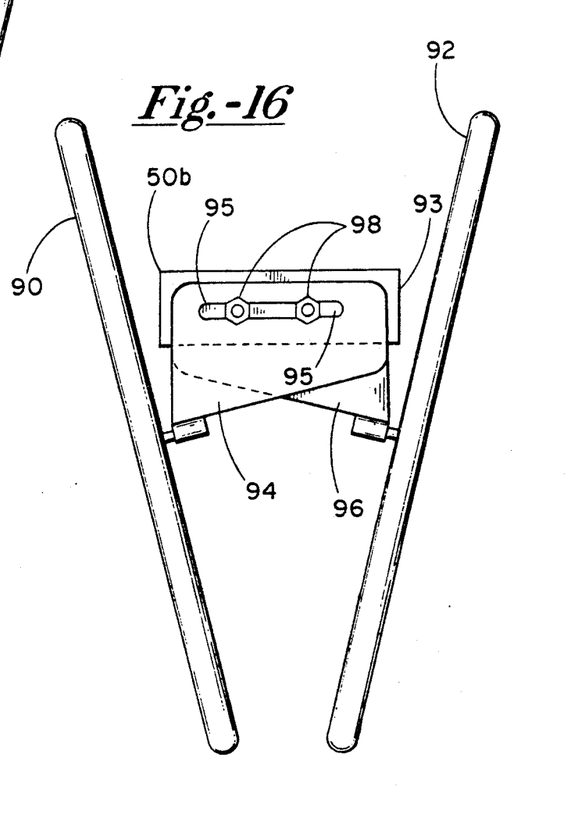

A pair of furrow-closing or press wheels 90 and 92 are rotatably supported on a flange 93 at the rear of the segment 50b belonging to the arm unit 50. The spacing of these press wheels 90, 92 is adjustable so that the lower peripheries thereof can be moved from the greater spacing thereof depicted in FIG. 15 closer together to increase the amount of closing pressure as shown in FIG. 16 (and conversely decrease the amount of closing pressure when spaced farther apart as in FIG. 15) in accordance with the specific condition of the soil. To do this, as can be understood from FIG. 15, the wheels 90, 92 are journaled for rotation on shiftable plates 94 and 96, respectively, the plate 94 having a horizontal slot 95 and the plate 96 having a horizontal slot 97, the plates 94 and 96 being held in their adjusted position by bolts 98.

Recapitulating to a degree at this stage of the description, it can be stated that the gauge wheels 82 and 86 are movable independently of each other and the press wheels 90 and 92 are independently movable relative to the two gauge wheels 82, 86. The benefit to be gained by this independent movement will become clearer hereinafter. All that the reader need understand at this particular time is that the walking beam system 40 enables this relative or independent wheel relationship to be achieved.

The above independent movement of the gauge wheels 82, 86 and the press wheels 90, 92 (which move in unison with each other) are also independently movable in relation to two furrow-forming discs 100 and 102 which ar mounted for rotation on a block 104 having laterally projecting, inclined stub shafts 106 and 108, the disc 100 being journaled on the shaft 106 and the disc 102 journaled on the shaft 108. The block 104 is fixedly attached to a portion of the frame 26. Owing to the inclination and convergence of the discs 100 and 102, it will be understood that these discs literally plow through the soil 24 when forming a furrow.

Although the function of the discs 100, 102 is to flip the soil to either side in the formation of a furrow, it is the responsibility of a V-shaped shoe 112 to achieve this; however, the forward end of the shoe curves upwardly to provide a toe 112a that presses or compacts the soil at the bottom of the furrow to provide a firm bed for receiving the seed via a slot in the upper portion of the shoe 112. In practice, the bottom of the shoe 112 is approximately ⅛th inch below lower peripheral segments of the discs 100 and 102. In this way, the discs 100 and 102 first displace the soil to either side and then the shoe 112, largely by virtue of its sloping toe 112a, presses or compacts the soil to provide a V-shaped and firm seed bed.

The apparatus 10 employs a seed metering device 116 having a casing composed of two parts or halves 118a and 118b. The casing parts 118a and 118b are normally closed, but have been opened in FIG. 17 to facilitate an understanding of the metering device 116. The device 116 includes a rotatable disc or seed plate 120 having a plurality of angularly spaced holes 122 extending therearound. The disc or seed plate 120 also has a central non-circular hole 124 formed therein so that the disc 120 can be mounted on a non-circular stub shaft 125 that rotates in a bearing 126 contained in the casing part 118a, the disc or seed plate 120 being held in place on the shaft 125 by means of a cap 127.

Figure 17:
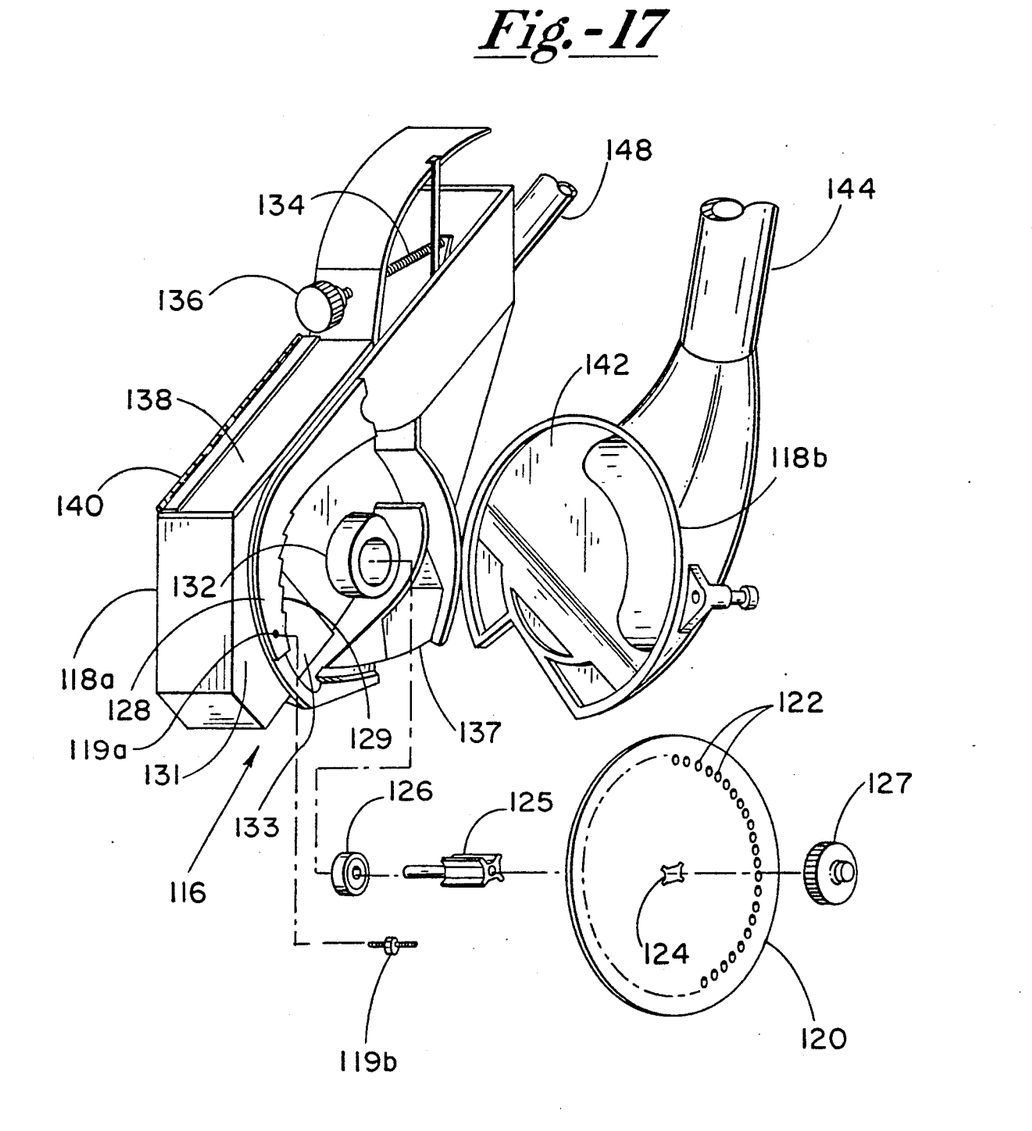
FIG. 17 is an exploded perspective view of the seed metering device, the casing thereof being illustrated in an "open book" manner with the rotatable disc having the seed holes therein shown in a separated relation.

Continuing with the description of the metering device 116, a seed wiper blade or arm 128 having a toothed edge 129 is pivotally attached at 119a to a flange 131 by means of a double-ended bolt 119b. The flange 131 has a hub 132 integral therewith through which the shaft 125 projects, the outer race of the bearing 126 being mounted in the hub 132. By means of a threaded shank 134 having a knob 136 at its upper end, the free end of the blade or arm 128 can be adjusted relative to the series of seed holes 122 formed in the disc 120. In this way, should there be more than one seed associated with any one hole 122, the blade or arm 128 simply scrapes or knocks off the excess seed or seeds so that only one seed is lodged at any given time in a single hole 122 and is delivered via a discharge opening 137 in the bottom of the casing part 118a.

The casing part 118a, as can be appreciated from FIG. 17, has a metal inspection cover 138 hinged at 140 to the casing part 118a. This window 138 enables an operator to follow the apparatus 10 as it traverses a field to make certain that each hole 122 receives a seed so that there are no "skips."

The casing part 118b forms an annular chamber 142 having a vacuum hose 144 connected thereto. By virtue of a hydraulically driven (not visible) vacuum pump, a vacuum is maintained during operation so as to retain a seed in each of the holes 122 under optimum conditions, doing so via a pie-shaped opening 133 in the flange 131 which is in registry with a segmental portion of the seed disc 120. However, the chamber 142, while referred to as being annular, does not extend completely around the casing part 118b. In the region labeled 137, the vacuum is broken so that each seed as it reaches 4:30 o'clock position is permitted to drop into the furrow that has been formed by the furrow-forming discs 100, 102 and the shoe 112, the seed actually passing downwardly through the open rear bottom portion of the shoe 112.

A seed supply hose 148 extends upwardly from the casing part 118a to a seed hopper 152 mounted on a platform 154 that extends rearwardly in a cantilever-fashion from the tool bar 12, being fixedly attached to the tool bar by a plurality of U-bolts. Within the hopper is a dispensing device (not visible) driven by the ground-engaging wheel 22.

Reference will be made at this time to a herbicide container 156 also mounted on the platform 154. A hose 158 extends downwardly from the herbicide container 156 to a discharge nozzle 160 located just above the furrow that is formed as the planter 10 progresses across a field.

It is important to appreciate that the seed hopper 152 and the herbicide container 156, being mounted on the platform 154, are actually supported by the tool bar 12 and not by the planting apparatus 10. The seed hopper 152, it can be stated, contains at the outset perhaps 150 pounds of seed. However, as the seed is progressively discharged into the furrow by virtue of the seed metering device 116, the weight or mass is steadily decreased. Such a decrease can adversely affect the initial depth setting that is achieved by adjusting the handle member 74. An arcuate gauge 162 indicates when the handle member 74 has been properly positioned for the particular planting depth that is desired. Although not shown, a pin element is inserted through a portion of the handle 74 member and the gauge 162 to hold and retain the handle member 74 in whatever adjusted position it has been moved into, a series of vertically spaced holes (also not shown) in the gauge 162 enabling the operator to do this.

Once again, it will be mentioned that the planting apparatus 10 is duplicated for whatever number of rows are to be planted. To plant twelve rows, twelve planters 10 would be mounted on the tool bar 12 which would possess a length sufficient to accommodate twelve such planters 10. Although only two ground-engaging wheels 22 are required, since one of these wheels serves as a driving wheel for the auxiliary equipment, there will be a series of transversely extending flexible shafts that interconnect the auxiliaries. The auxiliaries, it can be explained, include the seed metering device 116, the vacuum pump and the dispensing device.

Although the foregoing description should suffice to enable my invention to be readily understood, nonetheless a brief operational sequence will assure a full appreciation of the benefits to be gained with planting apparatus 10 of the type herein illustrated. With this in mind, if a relatively shallow furrow 164 is to be formed, the handle member 74 would be raised into the position in which it appears in FIGS. 1 and 6. What this does, acting through the articulated linkage assembly 54 of the walking beam system 40, is to raise the assembly 54 which raises the segments 42b and 46b of the arm units 42 and 46, respectively. This action causes the gauge wheels 82 and 86 to be moved downwardly relative to the furrow-opening discs 100 and 102. When riding over the soil 24, the discs 100, 102 bear against the ground 24 and since their peripheries are lower than the peripheral edges of the discs 100 and 102, the effective depth of the discs 100, 102 is lessened and the relatively shallow furrow 164 is formed. The shoe 112 is fixedly mounted to the frame 26 in relation to the block 104 on which the discs 100 and 102 are rotatably mounted, so that the bottom of the shoe 112 is somewhat lower than the lowermost peripheral edges of the discs 100 and 102. It then follows that the shoe 112, being that its bottom is lower, presses or compacts the bottom of the furrow 164 to form a firm V-shaped seed bed.

Figures 6, 7:
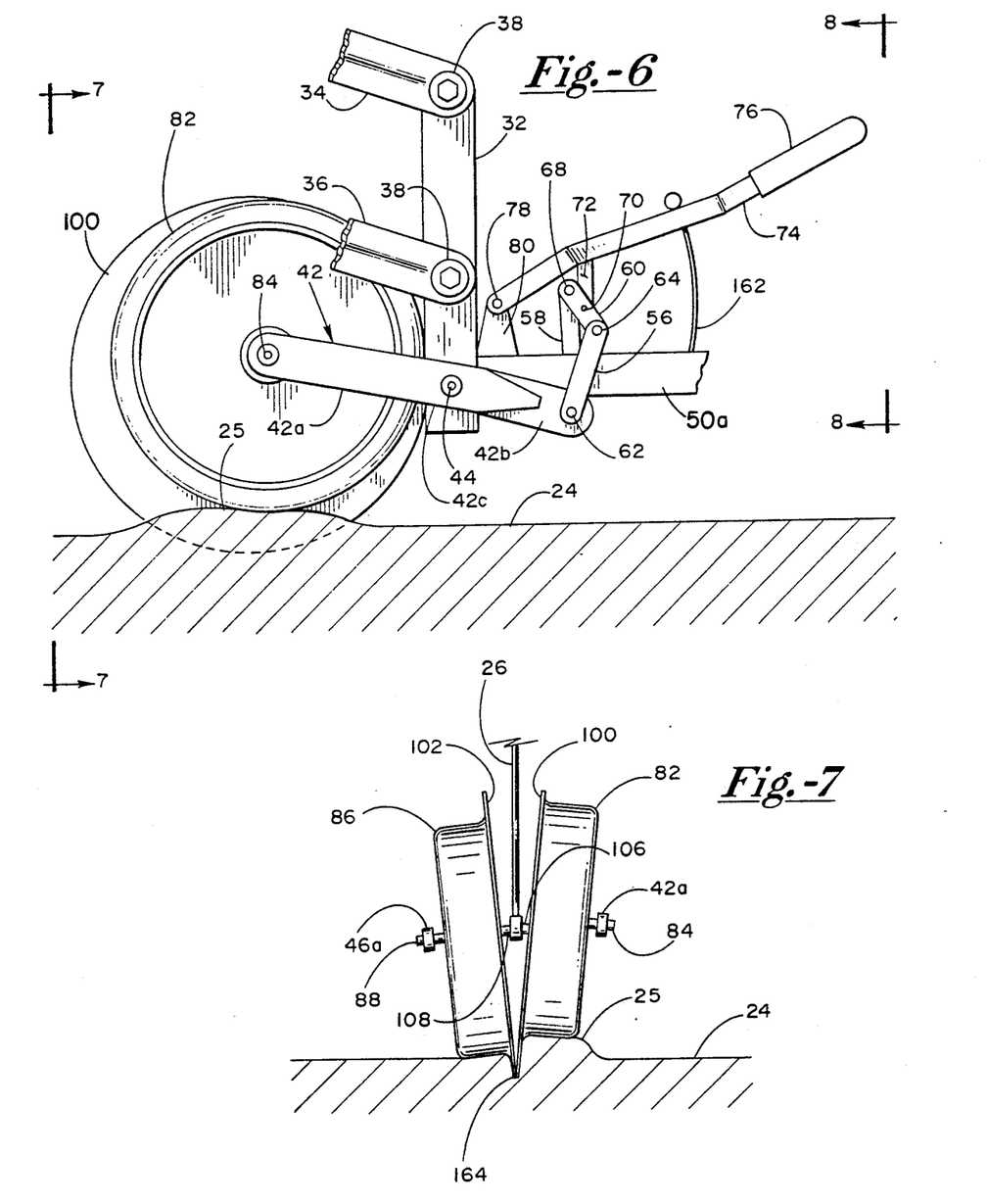
FIG. 6 is a side elevational view corresponding to FIG. 1 (although with some parts omitted for simplicity reasons) but illustrating the gauge wheel of FIG. 1, which is the gauge wheel at the right in FIG. 3, when raised due to encountering an uneven or bumpy soil condition.
FIG. 7 is a view taken in the direction of line 7—7 of FIG. 6, the view showing more clearly the relationship between the two gauge wheels and the opening discs that form the furrow.
Figure 8:
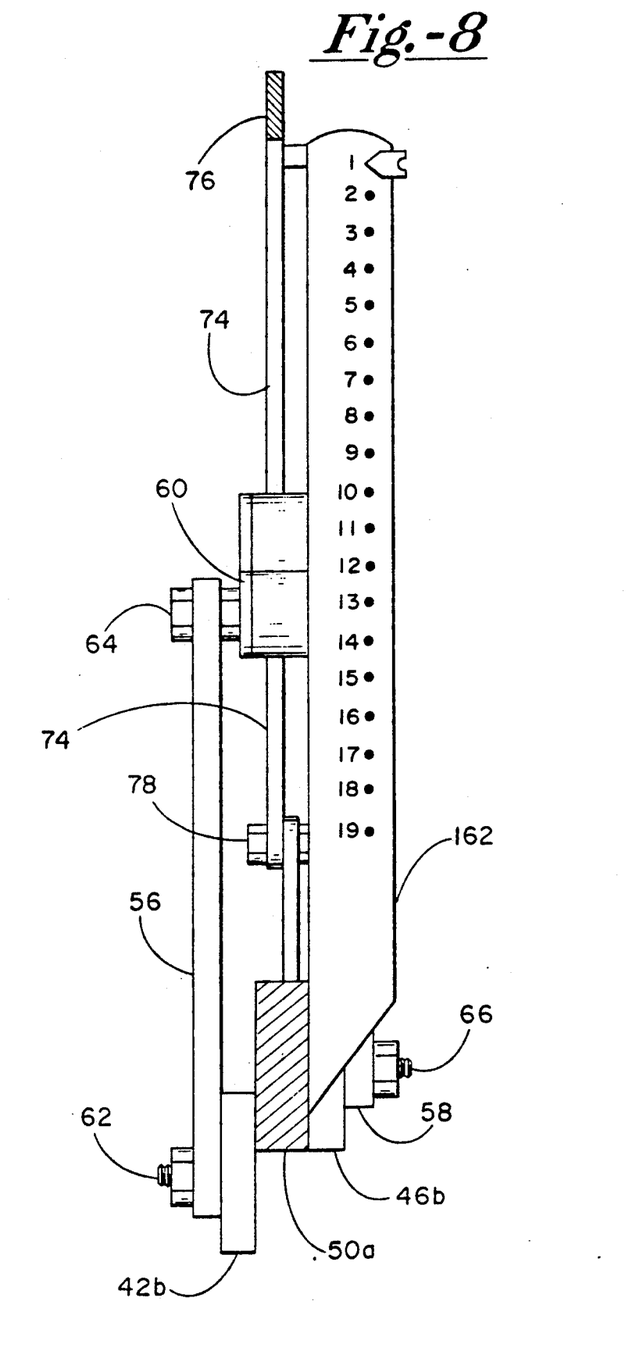
FIG. 8 is a view in the direction of line 8—8 of FIG. 6, this view showing the articulated linkage assembly in the condition it assumes when the soil condition of FIG. 6 is encountered.

Should either gauge wheel 82 or 86 ride over an obstruction, such as a rock, or just a raised portion 25 of the soil 24, the walking beam system 40 compensates for any such difference in elevation between the wheels 82 and 86. FIG. 7 has been selected to show the gauge wheel 82 somewhat raised with respect to the gauge wheel 86. Thus, the gauge wheel 86 is serving as a reference or datum for the depth of the furrow 164 being cut or formed by the discs 100 and 102 with the aid of the shoe 112. The relationship of the various links constituting the articulated linkage assembly 54 should demonstrate that the raising of the wheel 82 does not adversely affect the depth setting that has been selected by positioning the handle member 74. By the same token, if the gauge wheel 86 should ride up over some obstruction or raised portion 25 of the soil 24, then the gauge wheel 82 will serve as a reference for the discs 100 and 102. This latter condition has not been depicted, but it is simply the opposite of the illustrated condition in which the gauge wheel 82 has been elevated.

Moreover, due to the fact that the weight of the filled seed hopper 152 and the filled herbicide container 156 are mounted on the platform 154, which is supported by the tool bar 12, it follows that the desired depth of the furrow 164 is not adversely affected, a situation easily occurring when the soil 24 is soft and moist. Also, the apparatus 10 is not as likely to be damaged when a rock or other object is struck, especially when the hopper 152 is full of seed.

Figure 9:
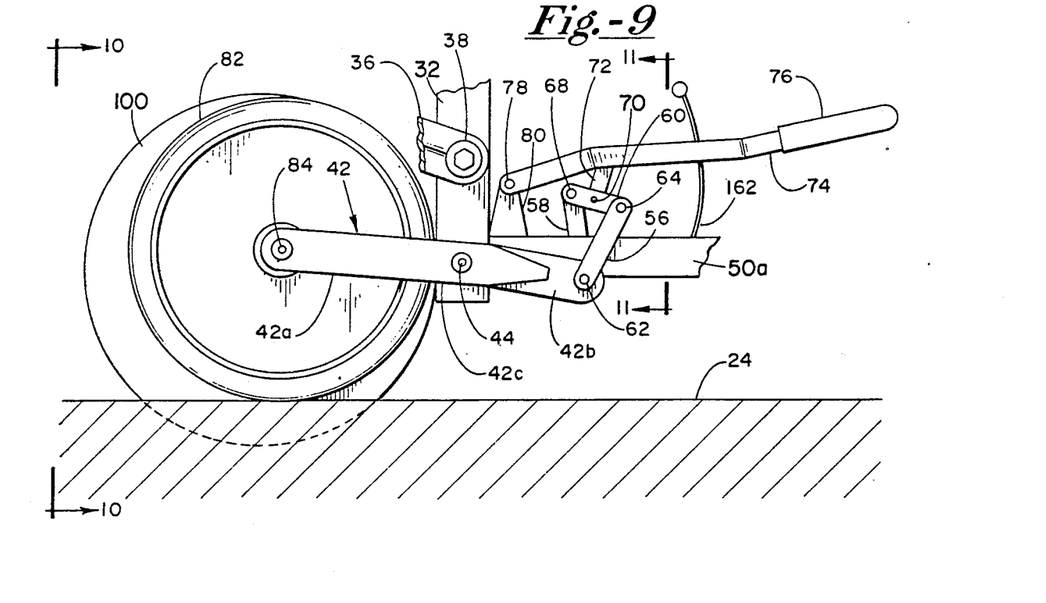
FIG. 9 pictures the same fewer components that appear in FIG. 6, but with the apparatus adjusted for a deeper furrow and with the gauge wheels traversing smooth or even ground.
Figure 10:
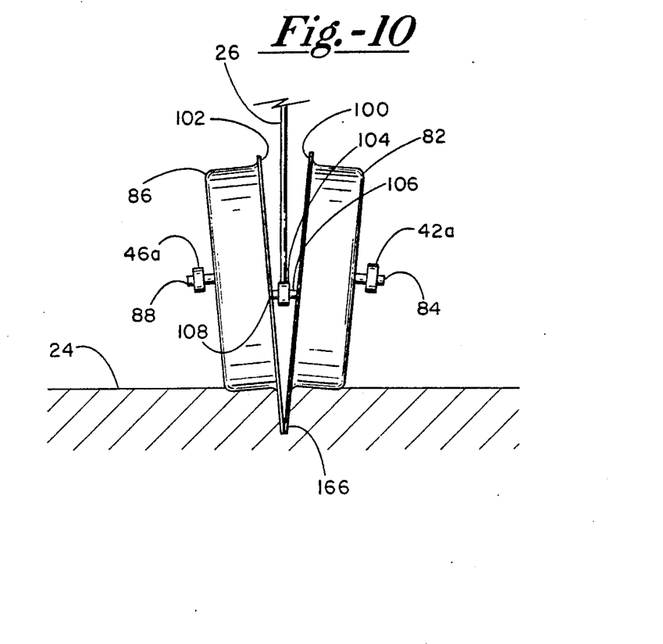
FIG. 10 is a view taken in the direction of line 10—10 of FIG. 9.
Figures 11, 13:
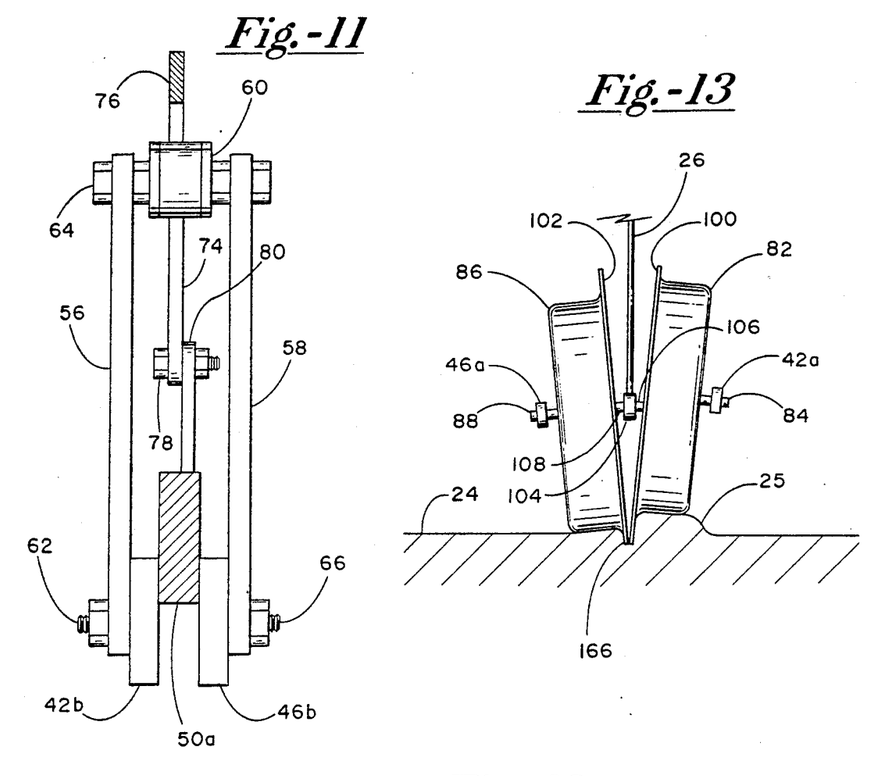
FIG. 11 is a view taken in the direction of line 11—11 of FIG. 9, the view showing the relation of the articulated linkage assembly when adjusted for forming the deeper furrow for which the apparatus is adjusted.
FIG. 13 is a view taken in the direction of line 13—13 of FIG. 12 in order to depict the raised condition of the gauge wheel visible in FIG. 12 and which gauge wheel is at the right in this view.
Figure 12:
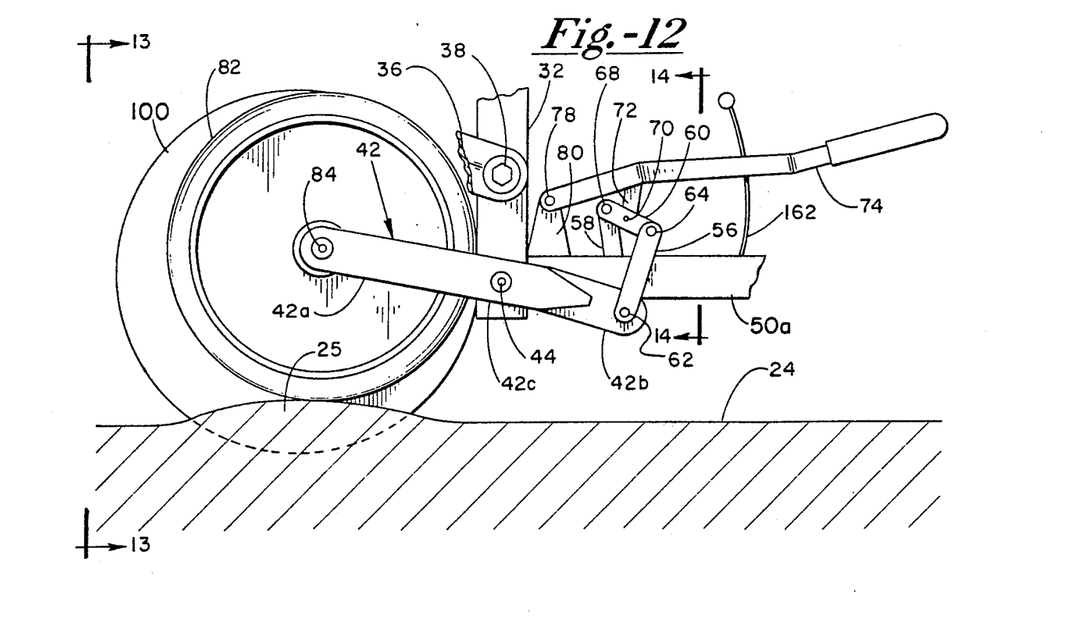
FIG. 12 is a side elevational view similar to FIG. 9, but with the gauge wheel visible in FIG. 9 raised due to an uneven ground condition.
Figure 14:
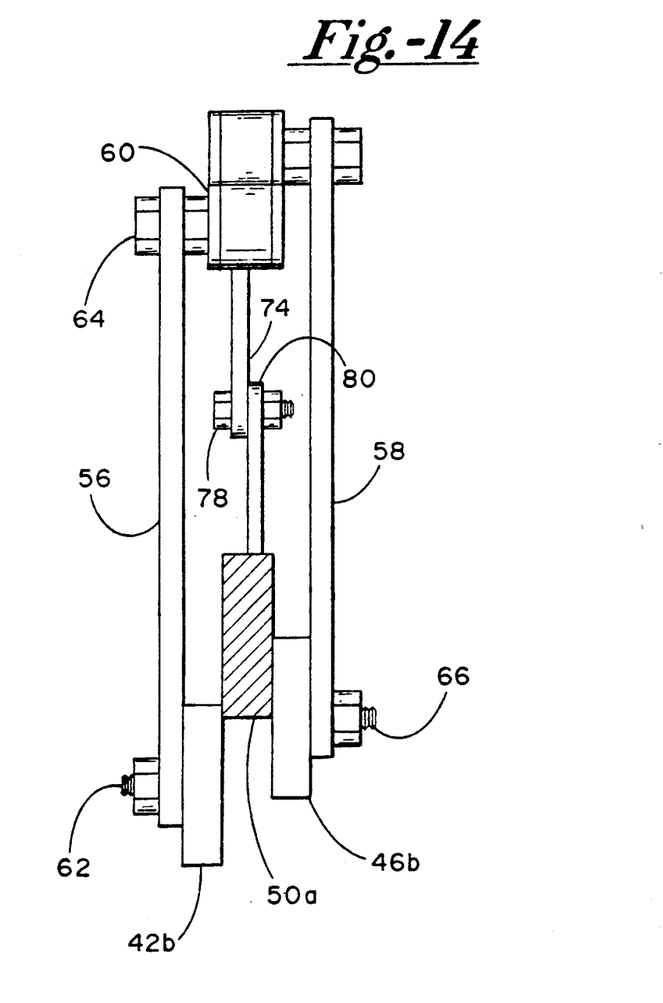
FIG. 14 is a view taken in the direction of line 14—14 of FIG. 9 for once again depicting the relationship of the components constituting the articulated linkage assembly resulting from the soil condition experienced in FIG. 12.

To present further evidence of the versatility of my planting apparatus 10, FIGS. 9 and 12 have been presented, together with FIGS. 10 and 11 (associated with FIG. 9) and FIGS. 13 and 14 (associated with FIG. 12). In these figures, the handle member 74 has been lowered with respect to the arcuate gauge 162 to form a relatively deep furrow 166, as can be discerned in FIGS. 10 and 13. What occurs in this situation is that both gauge wheels 82 and 86 are raised relative to the furrow-opening discs 100 and 102. All that need be understood is that the articulated linkage assembly 54 is pushed downwardly so that the segments 42b and 46b are forced downwardly also to cause the segments 42a and 46a to rise. In other words, the arm units 42 and 46 are rocked in a clockwise direction a viewed in FIGS. 9 and 12 (and also as viewed in FIG. 1) to raise the gauge wheels 82 and 86 so that the discs 100 and 102 extend to an elevation therebelow, an elevation sufficient to form the relatively deep furrow 166.

Here again, demonstrating the versatility of my planting apparatus 10, an obstruction or raised soil condition is assumed to be encountered by the gauge wheel 82 so that it is forced upwardly, but the gauge wheel 86 remains at the lower or unraised position so that it functions as a reference with respect to the lower edges of the discs 100 and 102, maintaining the selected depth for the furrow 166.

I claim:

1. Planting apparatus comprising, in combination: frame means, furrow-opening means attached to said frame means, first and second arm units, each arm unit being independently pivotally mounted to said frame means for providing forwardly and rearwardly disposed end portions, a gauge wheel rotatably carried on the forward end portion of each of said arm u nits, and articulated means interconnecting the rear end portions of said units with each other so that said gauge wheels are movable relative to each other comprising, in combination: a butterfly link having a first end and a second end, with the butterfly link being pivotally mounted with respect to the frame means about a pivot axis located intermediate the first and second ends of the butterfly link; a first link pivotally connected to the first end of the butterfly link and to the rearwardly disposed end portion of the first arm unit; and a second link pivotally connected to the second end of the butterfly link and to the rearwardly disposed end portion of the second arm unit.

2. Planting apparatus in accordance with claim 1 including handle means for raising and lowering said pivot axis of the butterfly link relative to the frame means.

3. Planting apparatus in accordance with claim 2 in which said handle means includes a third arm unit having a portion thereof pivotally connected to said butterfly link by the pivot axis for raising and lowering said butterfly link relative to the frame means.

4. Planting apparatus in accordance with claim 3 including a fourth arm unit having a forwardly disposed end portion pivotally connected to said frame means and an intermediate portion pivotally connected to said third arm unit, and furrow-closing means carried by the rearwardly disposed end portion of said fourth arm unit, the forwardly disposed end portion of said third arm unit being pivotally connected to the intermediate portion of said fourth arm unit.

5. Planting apparatus in accordance with claim 4 including a transverse tool bar, means secured to said tool bar projecting forwardly therefrom, ground-engaging wheel means journaled for rotation at the forward end of said projecting means, platform means fixedly secured to said tool bar and projecting rearwardly therefrom, and a seed hopper supported on said platform means.

6. Planting apparatus in accordance with claim 5 including seed metering means for depositing seed from said hopper into the furrow formed by said furrow-opening means, said metering means having a discharge opening disposed just above the furrow formed by said furrow-opening means.

7. Planting apparatus in accordance with claim 1 wherein the furrow-opening means is fixedly attached to said frame means; and wherein the gauge wheels are independently movable relative to said furrow-opening means.

8. Planting apparatus in accordance with claim 7 wherein the furrow-opening means comprises, in combination: first and second discs rotatably mounted in an inclined and converging relation, with the gauge wheels located on and slideably abutting against the outside surfaces of the first and second discs.

9. Planting apparatus in accordance with claim 1 including a third arm unit having a forwardly disposed end portion pivotally connected to said frame means, an intermediate portion, and a rearwardly disposed end portion, and furrow-closing means carried by the rearwardly disposed end portion of said third arm unit, with the butterfly link being pivotally connected to the intermediate portion of said third arm unit.

10. Planting apparatus in accordance with claim 9 further comprising, in combination: means for raising and lowering said pivot axis of the butterfly link relative to the third arm unit.

11. Planting apparatus in accordance with claim 10 wherein the raising and lowering means comprises a handle having a portion thereof pivotally connected to the intermediate portion of the third arm unit, with the butterfly link being pivotally connected to the handle.

12. Planting apparatus comprising, in combination: frame means; furrow-opening means attached to said frame means; first and second arm units, each arm unit being independently pivotally mounted to said frame means for providing forwardly and rearwardly disposed end portions; a gauge wheel rotatably carried on the forward end portion of each of said arm units; a third arm unit having a forwardly disposed end portion pivotally connected to said frame means, an intermediate portion, and a rearwardly disposed end portion; furrow-closing means carried by the rearwardly disposed end portion of said third arm unit; and articulated means interconnecting the rear end portions of said arm units with each other so that said gauge wheels are movable relative to each other, with the articulated means being connected to the intermediate portion of the third arm unit.

13. Planting apparatus in accordance with claim 12 including means for raising and lowering said articulated means relative to the third arm unit.

14. Planting apparatus in accordance with claim 13 in which said raising and lowering means includes a handle having a portion thereof pivotally connected to said articulated means for raising and lowering said articulated means relative to the third arm unit.

15. Planting apparatus in accordance with claim 12 wherein the furrow-opening means is fixedly attached to said frame means; and wherein the gauge wheels are independently movable relative to said furrow-opening means.

16. Planting apparatus in accordance with claim 15 wherein the furrow-opening means comprises, in combination: first and second discs rotatably mounted in an inclined and covering relation, with the gauge wheels located on and slideably abutting against the outside surfaces of the first and second discs.

17. Planting apparatus in accordance with claim 12 wherein the articulated means comprises, in combination: a butterfly link having a first end and a second end, with the butterfly link being pivotally mounted with respect to the third arm unit about a pivot axis located intermediate the first and second ends of the butterfly link; a first link pivotally connected to the first end of the butterfly link and to the rearwardly disposed end portion of the first arm unit; and a second link pivotally connected to the second end of the butterfly link and to the rearwardly disposed end portion of the second arm unit.

18. Planting apparatus in accordance with claim 17 further comprising, in combination: means for raising and lowering the pivot axis of the butterfly link relative to the third arm unit.

19. Planting apparatus in accordance with claim 18, wherein the raising and lowering means comprises a handle having a portion thereof pivotally connected to the intermediate portion of the third arm unit, with the butterfly link being pivotally mounted to the handle about the pivot axis.

20. Planting apparatus in accordance with claim 19 including seed metering means for depositing seed from a hopper into the furrow formed by said furrow-opening means, said metering means having a discharge opening disposed just above the furrow formed by said furrow-opening means.

* * * * *

UNITED STATES PATENT AND TRADEMARK OFFICE
CERTIFICATE OF CORRECTION

PATENT NO. : 5,074,227
DATED : December 24, 1991
INVENTOR(S) : Wayne J. Schwitters It is certified that error appears in the above-identified patent and that said Letters Patent is hereby corrected as shown below:

Column 1, line 25, cancel "termination" and substitute therefor --germination--.

Column 1, line 49, cancel "dress" and substitute therefor --press--.

Column 6, line 56, cancel "ar" and substitute therefor --are--.

Column 9, line 37, cancel "a viewed" and substitute therefor --as viewed--.

Column 9, line 57, cancel "u nits," should read --units,--.

Column 9, line 59, before "units" insert --arm--.

Column 12, line 19, cancel "18," should read --18--.

Signed and Sealed this

Twentieth Day of April, 1993

Attest:

MICHAEL K. KIRK

*Attesting Officer*     *Acting Commissioner of Patents and Trademarks*